J. F. TRITLE.
MOTOR CONTROL SYSTEM.
APPLICATION FILED NOV. 14, 1908.
917,190.
Patented Apr. 6, 1909.
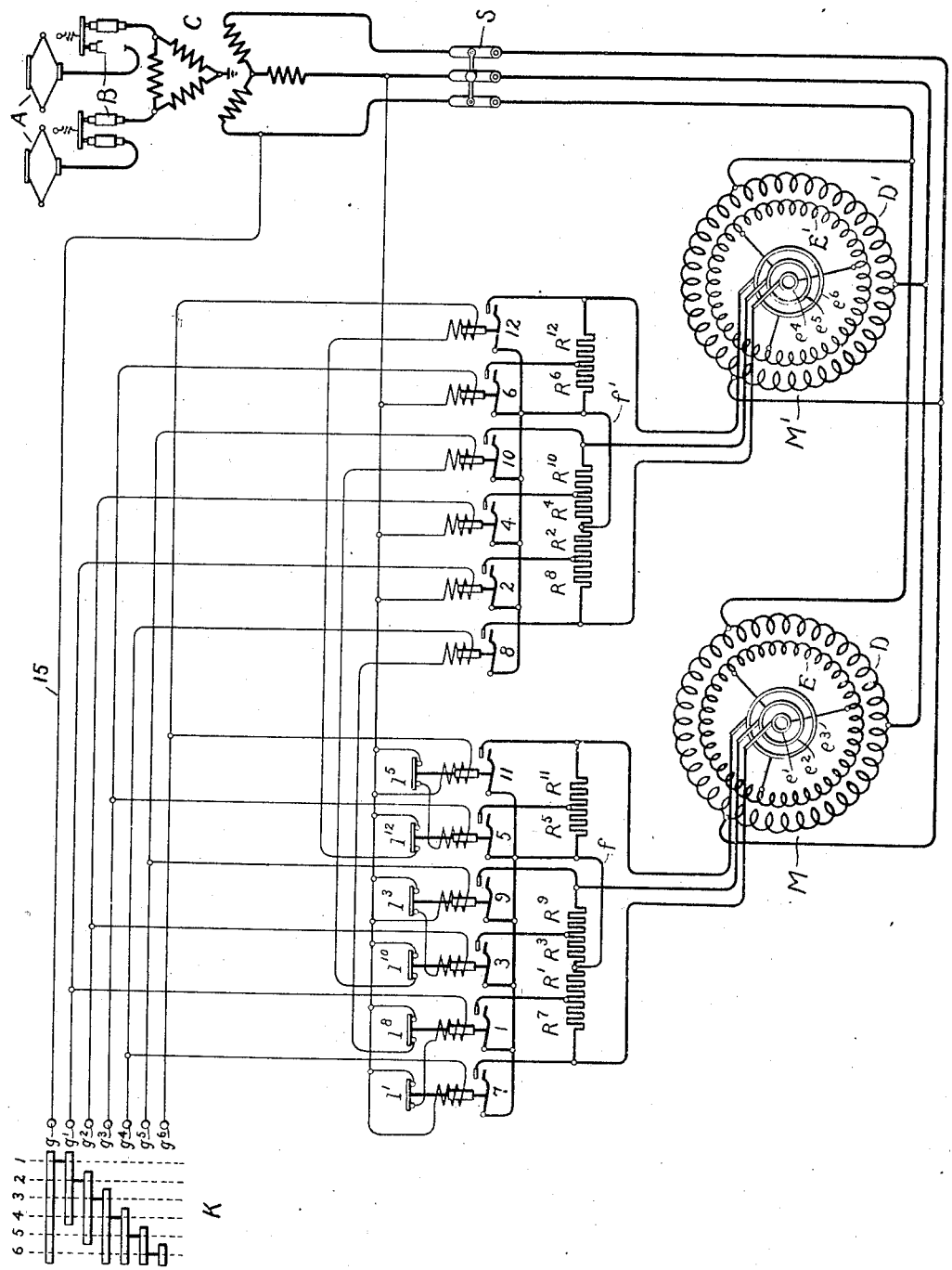
WITNESSES:
Lester H. Palmer
J. Ellis Glen
INVENTOR
JOHN F. TRITLE.
BY
ATTY.

UNITED STATES PATENT OFFICE.

JOHN F. TRITLE, OF SCHENECTADY, NEW YORK, ASSIGNOR TO GENERAL ELECTRIC COMPANY, A CORPORATION OF NEW YORK.

MOTOR-CONTROL SYSTEM.

No. 917,190.　　　　Specification of Letters Patent.　　　　Patented April 6, 1909.

Application filed November 14, 1903. Serial No. 462,561.

*To all whom it may concern:*

Be it known that I, JOHN F. TRITLE, a citizen of the United States, residing at Schenectady, county of Schenectady, State of New York, have invented certain new and useful Improvements in Motor-Control Systems, of which the following is a specification.

My invention relates to the control of electric motors by means of resistances and is particularly useful in connection with the control of a plurality of electric motors driving a common load. While in its broad aspect it is not limited to the control of induction motors, it is particularly applicable to motors of that type having resistances in circuit with their respective secondaries, which resistances are cut out step-by-step as the motor starts. It has been customary heretofore in the control of a plurality of such motors arranged to drive a common load, such as a locomotive, car or other vehicle, to employ electrically controlled switches for successively short circuiting corresponding portions of the resistances for the several motors, said switches being controlled from a suitable master switch.

Broadly considered, the object of my invention is to make smoother the acceleration of vehicles driven by a plurality of motors. To this end, my invention, in one particular embodiment, consists in so arranging the short circuiting switches and the control circuits therefor that in certain positions of the master-switch certain of the corresponding switches for the several motors will close automatically in succession instead of simultaneously. With such an arrangement the various motors of the vehicle will not be accelerated step-by-step at exactly the same instant and the resulting acceleration of the vehicle will be smoother than under present practice where all of the switches controlling corresponding sections of resistances for the various motors close at the same time.

In carrying out my invention I provide the electrically controlled switches, which short circuit the resistances for the various motors, with interlocking switches whereby in certain positions of the master-switch certain corresponding switches for the various motors close in succession and not simultaneously.

My invention will best be understood by reference to the accompanying drawing which shows diagrammatically a motor control system arranged in accordance with my invention.

The drawing shows diagrammatically a motor control system adapted for the control of two polyphase induction motors driving a vehicle or other common load.

A represents the current collectors or trolleys which are shown as of the bow trolley type.

B represents main switches in series with the primary windings of the step-down transformer C, to the secondary windings of which the primary windings D and D' of the motors M and M' are connected.

The secondary windings of the motors M and M' are indicated at E and E', in circuit with which are connected sections of resistance $R'$ to $R^{12}$, through collector rings $e'$, $e^2$, $e^3$, $e^4$, $e^5$, and $e^6$. The arrangement of the resistances shown is the three-phase Y connection comprising in the case of each motor three groups of resistance, one in each phase, the groups of the motor M having a common terminal $f$ and the groups of the motor M' have a common terminal $f'$. For the sake of simplicity in illustration I have shown a system in which each group of resistances comprises but two resistance sections, but obviously any desired number might be employed.

In the particular system shown, 1 to 12 inclusive indicate electrically controlled switches arranged to short circuit the sections of resistance under the control of the master-switch K, diagrammatically indicated in a usual conventional manner. For the sake of simplicity the master-switch has been shown as serving simply to control the resistance controlling switches, the switch S being shown as serving to connect the primaries of the motors to the secondaries of the transformer C; it is obvious, however, that the master-switch K would in practical operation be arranged to close, in its 1st. position, line switches corresponding to the switch S.

The master-switch K comprises seven stationary contact fingers $g$ to $g^6$ inclusive, said fingers being arranged to coöperate with segments on a drum having 6 positions indicated by the dotted lines 1 to 6. The segments of the master-switch are all electrically connected and the stationary finger $g$ and its coöperating segment serve in all "on"

positions of the master-switch to connect the segments to one phase of the source through the wire 15 as shown. The fingers $g'$ to $g^6$ inclusive are connected through control wires, as shown, to the actuating coils of the electrically controlled switches 1 to 12 inclusive, certain of said switches being provided with interlocking switches, shown in the usual diagrammatic manner, which control the energization of the actuating coils of the electrically controlled switches in a manner which will now be described.

When the switch S is closed, the master-switch K being in its "off" position as shown, the primary circuits of the motors M and M' are connected to the secondaries of the transformer C and the motors start with all of the resistances in their secondary circuits. When the master-switch K is moved to its 1st "on" position, the contact fingers $g$ and $g'$ are connected together, thereby causing the energization of the actuating coils of the switches 1 and 2 the circuit for the former being completed through interlocking switch $l'$ on the switch 7 arranged to be opened by the latter when it closes. Closing of the switches 1 and 2 results in the simultaneous short circuiting of the sections of resistance $R'$ and $R^2$ located, respectively, in one of the phases of the secondaries of the motors M and M'. In the 2nd position of the master-switch K the actuating coil of the switch 3 is energized through the interlock $l^3$ on the switch 9, and the actuating coil of the switch 4 is also energized; the switches 3 and 4, therefore, close. Switches 3 and 4 in closing short circuit sections of resistance $R^3$ and $R^4$ located, respectively, in another phase of the secondaries of the motors M and M'. In the 3rd position of the master-switch K the actuating coil of switch 5 is energized through the interlock $l^5$ on the switch 11, and the actuating coil of switch 6 is simultaneously energized; switches 5 and 6, therefore, close at the same time. Switches 5 and 6 short circuit sections of resistance $R^5$ and $R^6$ located, respectively, in a third phase of the secondaries of the motors M and M', respectively. Up to this point the sections of resistance in the secondary circuits of the motors have been short circuited in the usual order; that is, sections of resistance in corresponding phases of the secondaries of the motors have been short circuited simultaneously. During the further movement of the master-switch K, however, the short circuiting of the sections of resistance in the secondaries of the various motors will take place not simultaneously but in succession with a short interval of time intervening. In the 4th position of the master-switch K the actuating coil of the switch 7 is at once energized and this switch closes, thereby short circuiting the sections of resistances $R^7$ and $R'$ in one phase of the secondary of the motor M. The switch 8, however, although its actuating coil is connected to one phase of the source through the finger $g^4$ on the master-switch, will not close simultaneously with the switch 7 because the circuit through the actuating coil of the switch 8 is interrupted at the interlock $l^8$ which opened when the switch 1 closed. Closing of the switch 7, however, opens its interlock $l'$, thereby interrupting the circuit through the actuating coil of the switch 1, which will therefore open and close its interlock $l^8$. As soon as the interlock $l^8$ closes, the actuating coil of the switch 8 is energized and this switch closes, thereby short circuiting the sections of resistances $R^8$ and $R^2$ in one phase of the secondary of the motor M'. With this arrangement it is clear that a certain interval of time must elapse between closing of switch 7 and closing of switch 8 and their simultaneous closing is impossible. As the switch 7 short circuits both sections $R^7$ and $R'$, opening of the switch 1 will have no effect. When the master-switch K is moved to its 5th position the finger $g^5$ engages with its coöperating segment and the actuating coil of the switch 9 is energized, thereby causing that switch to close, which in closing opens its interlock $l^3$ and interrupts the circuit through the actuating coil of the switch 3. The switch 10 will not close simultaneously with the switch 9, since its actuating coil will be energized only after the switch 3 has opened and closed its interlock $l^{10}$. The switches 9 and 10 will therefore close in succession as in the case of switches 7 and 8. Switches 9 and 10 short circuit, respectively, resistance sections $R^3$ $R^9$ and $R^4$ $R^{10}$. Since after the switch 8 has closed there is no need for maintaining the switch 2 closed, the segment which coöperates with the finger $g'$ may be omitted in the 5th and 6th positions of the master-switch, thereby allowing the switch 2 to open after the master-switch reaches those positions. In the 6th position of the master-switch, the switch 11 is first closed and the switch 12 closes a little later, after the switch 5 has opened and closed its interlock $l^{12}$ following the interruption of the circuit through its actuating coil by the opening of the interlock $l^5$, the connection closed by the switch 5 being no longer necessary owing to the closing of the switch 11. Switches 11 and 12 inclosing short circuit, respectively, resistance sections $R^5$ $R^{11}$ and $R^6$ $R^{12}$ coöperating with the motors M and M'. In this position of the master-switch the finger $g^2$ ceases to engage with its coöperating segment and the switch 4 is allowed to open.

It will be clear from the above that in the first three positions of the master-switch K the resistance sections in certain phases of the secondaries of the motors M and M' will be short circuited simultaneously, while in the 4th, 5th and 6th positions of the master-switch the resistance sections in the phases of the secondaries will be short circuited not simultaneously but successively with an interval of time intervening, the length of which depends upon the rate at which the electrically controlled switches open when deënergized. It is clear, therefore, that, although the master-switch has but six "on" positions, acceleration of the vehicle as a whole will take place in nine steps resulting in smoother acceleration of the vehicle than under the old practice of cutting out resistance sections in the secondaries of all the motors simultaneously.

While I have shown my invention as applied to the control of but two motors having connected in the phases of their secondaries resistances arranged in but two sections, it is, of course, to be understood that my invention may equally well be applied to any number of motors having resistances with any number of sections connected in the phases of their secondaries. For example, in the case of four motors with resistances in the phases of their secondaries having two sections each and with a master-switch having six positions, as in the arrangement shown, the effective number of acceleration steps would be fifteen. Likewise, with two motors having resistances made up of three sections in each phase of their secondaries and with a nine point master-switch, fifteen effective accelerating steps may be obtained. Or with four motors having resistances made up of three sections in the phases of their secondaries and with a nine point switch, twenty-seven effective accelerating steps will be obtained.

It is obvious that, if desired, interlocks might be provided on the electrically controlled switches and so arranged that even in the first three positions of the master-switch the switches which short circuit the sections of resistance for the various motors, will close not simultaneously but successively. That is, the circuit to the actuating coil of a switch coöperating with one motor might be led through an interlock closed by the corresponding switch coöperating with the other motor when the latter switch closes. Since, however, the electrically controlled switches usually employed close so much more quickly than they open, the time interval given by such an arrangement between the closing of corresponding switches would be very short, and probably the results obtained would not warrant the increased complication of circuits.

In order to get the proper gradation of acceleration the resistance sections should be properly proportioned, as will be understood by those skilled in the art.

I do not desire to limit myself to the particular construction and arrangement of parts here shown, but aim in the appended claims to cover all modifications which are within the scope of my invention.

What I claim as new and desire to secure by Letters Patent of the United States, is:—

1. In combination with a plurality of motors, resistances in circuit with the several motors, switches arranged to short circuit sections of said resistances, and means for causing successive closing of corresponding switches for the several resistances.

2. In combination with a plurality of motors, resistances having a plurality of sections in circuit with the several motors, as many switches as there are sections of resistance arranged to short circuit said sections of resistance, and means for causing successive closing of the switches which short circuit corresponding sections for all the resistances.

3. In combination with a plurality of electric motors, resistances in circuit with the several motors, electrically controlled switches arranged to short circuit sections of the resistances, a master-switch for controlling the operation of corresponding switches for all the resistances, and means for causing successive closing of corresponding switches.

4. In combination with a plurality of electric motors, resistances in circuit with the several motors, electrically controlled switches arranged to short circuit sections of said resistances, a master-switch for controlling the operation of corresponding switches for all the resistances, and means for causing automatic successive closing of corresponding switches.

5. In combination with a plurality of electric motors, resistances in circuit with the several motors, electrically controlled switches arranged to short circuit sections of said resistances, a master-switch for controlling the operation of corresponding switches for all the resistances, and means including interlocks on the said switches for causing automatic successive operation of corresponding switches.

6. In combination with a plurality of motors, resistances in circuit with the several motors, electrically controlled switches arranged to short circuit greater and greater portions of the resistances for the several motors beginning at the same point on each resistance and extending in the same direction, control circuits for said switches, and interlocking switches coöperating with said first mentioned switches and controlling said control circuits whereby certain corresponding switches for the several resistances close automatically in succession.

7. In combination with a plurality of motors, resistances in circuit with the several motors, electrically controlled switches arranged to short circuit successively greater portions of the several resistances, a master-switch for controlling the operation of corresponding switches for all the resistances, interlocking switches operated by certain of said electrically controlled switches located in the control circuits from said master-switch to said switches whereby closing of certain switches which short circuit portions of said resistances cause the opening of the switches which short circuit portions of said resistances included in the portions short circuited by the first named switches, and interlocking switches operated by said last mentioned electrically controlled switches whereby opening of the latter causes closing of certain electrically controlled switches for another resistance.

8. In combination with a plurality of electric motors, resistances having a plurality of sections in circuit with the several motors, electrically controlled switches arranged to short circuit single sections of resistance, electrically controlled switches arranged to short circuit a plurality of sections of resistance including the sections short circuited by the first mentioned switches, a master-switch for controlling the operation of corresponding switches for all the resistances, interlocking switches operated by the various electrically controlled switches whereby closing of a switch which short circuits a plurality of sections causes the opening of the switch which short circuits one of those sections and whereby opening of said last mentioned switch causes the closing of the switch which short circuits a plurality of sections of resistance for another motor.

9. In combination with a plurality of electric motors, resistances having a plurality of sections in circuit with the several motors, electrically controlled switches arranged to short circuit single sections of resistances, electrically controlled switches arranged to short circuit a plurality of sections of resistance including the sections short circuited by said first named switches, a master-switch for controlling the operation of corresponding switches for all the resistances, control circuits between said master-switch and said switches, and interlocking switches operated by certain of said electrically controlled switches arranged to interrupt the circuit through the actuating coil of a switch short circuiting a single section of resistance for one motor, when the switch short circuiting a plurality of sections including that section is closed, and to complete the actuating circuit for a switch arranged to short circuit a plurality of sections of resistance for another motor upon the opening of a switch short circuiting the single section of resistance for the first named motor.

10. In combination with two motors, a resistance in circuit with each motor, electrically controlled switches arranged to short circuit successively greater portions of each resistance beginning at the same point on each resistance, a master-switch for controlling the operation of corresponding switches for both resistances, and interlocking switches coöperating with said switches and located in certain control circuits therefor whereby closing of a switch short circuiting a portion of the resistance coöperating with the first motor causes the switch which has short circuited a smaller portion of that resistance to open, and whereby opening of said last mentioned switch causes closing of the switch for the other resistance corresponding to the first mentioned switch coöperating with the first resistance.

11. In combination with a plurality of induction motors, three-phase arrangements of resistances connected in Y in series with the secondaries of the several motors, electrically controlled switches arranged to short circuit portions of said resistances for the several motors, and means for causing certain corresponding switches for the resistances in corresponding phases of the secondaries of the several motors to close automatically in succession.

12. In combination with a plurality of induction motors, three-phase arrangements of resistances connected in Y in series with the secondaries of the several motors, electrically controlled switches arranged to short circuit portions of said resistances for the several motors, a master-switch for controlling the operation of said switches so as to short circuit corresponding portions of said resistances in corresponding phases of the secondaries of all the motors in the various positions of said master-switch, and means for automatically causing certain corresponding switches for the several resistances to close in succession including interlocking switches operated by said first named switches.

In witness whereof, I have hereunto set my hand this 12th day of November, 1908.

JOHN F. TRITLE.

Witnesses:
BENJAMIN B. HULL,
HELEN ORFORD.